May 16, 1939.  M. H. GROVE  2,158,068
GAS REGULATOR
Original Filed April 16, 1932  2 Sheets-Sheet 2
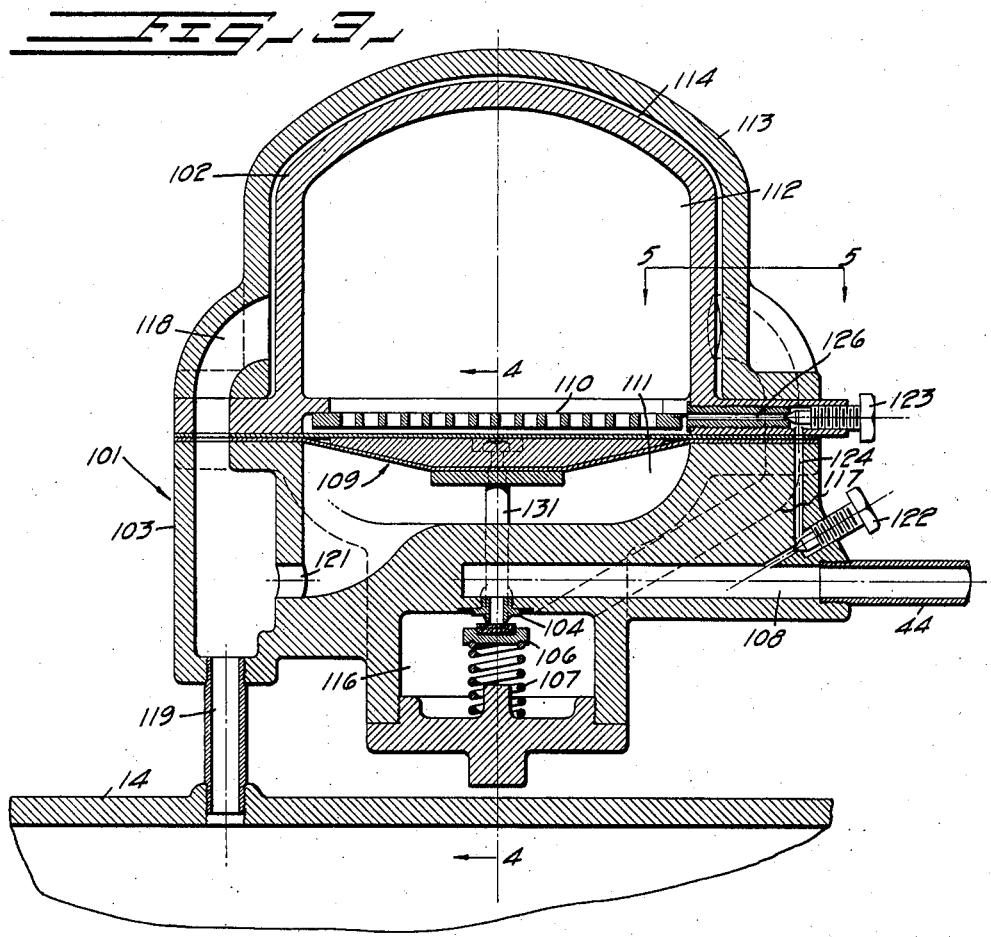
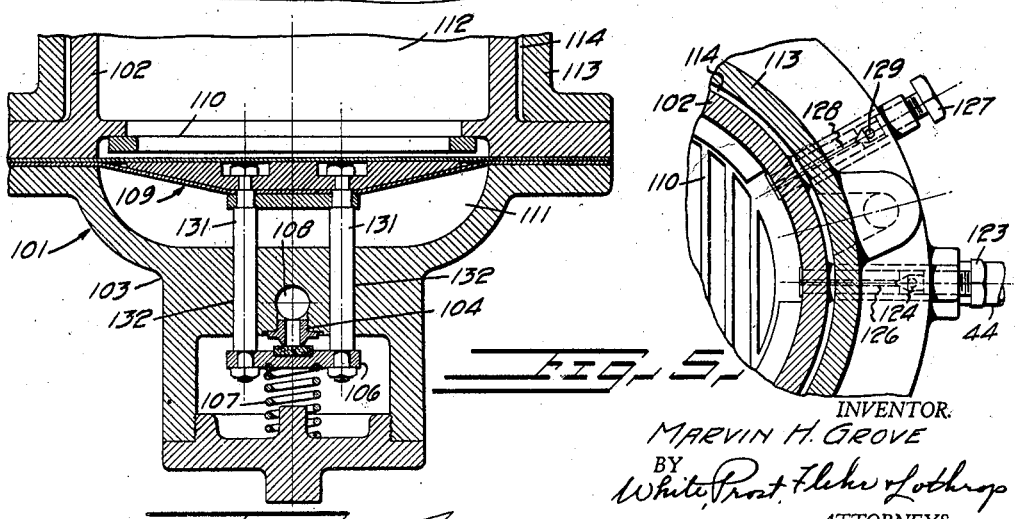
INVENTOR.
MARVIN H. GROVE
BY
ATTORNEYS.

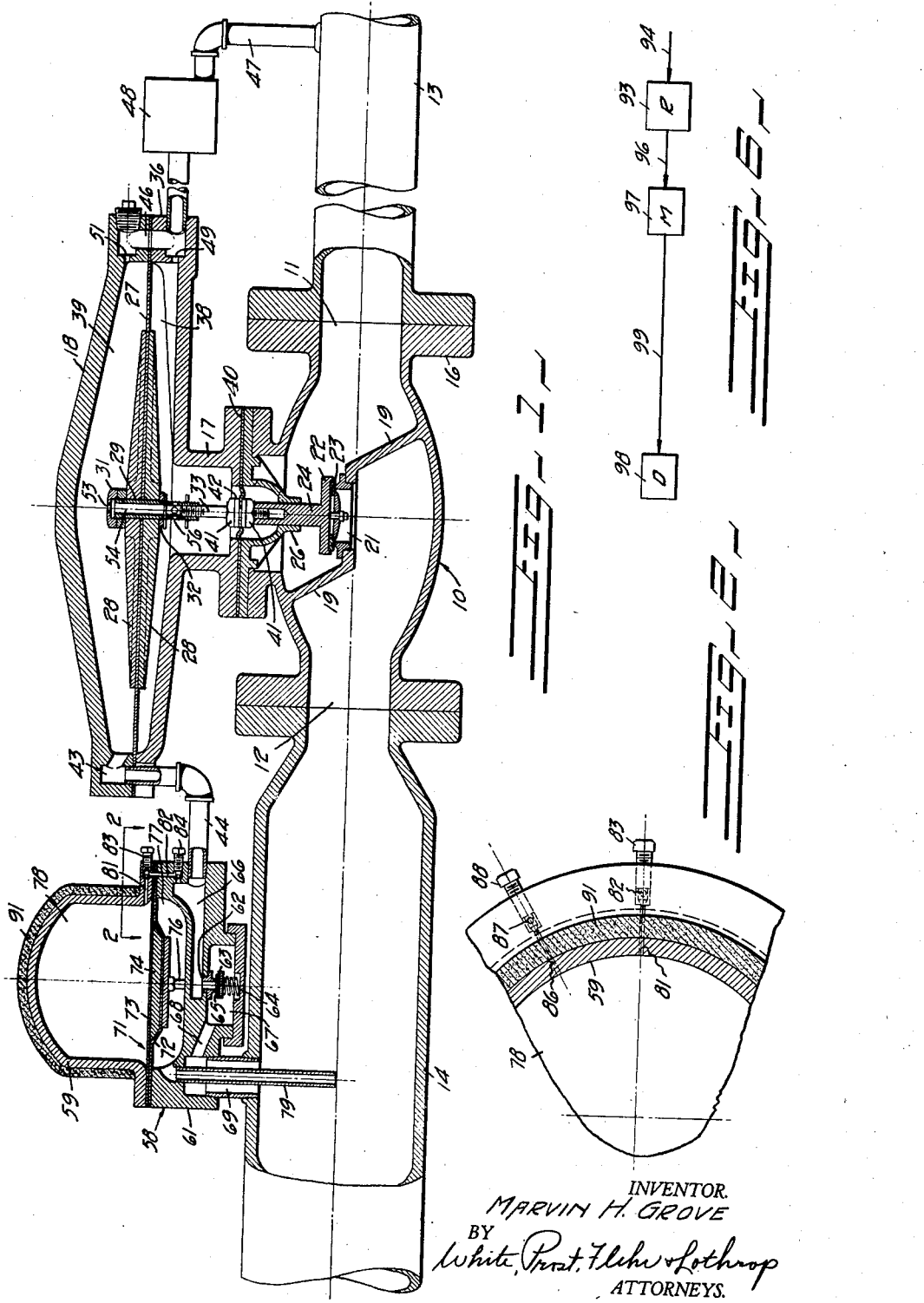

Patented May 16, 1939

2,158,068

UNITED STATES PATENT OFFICE 2,158,068

GAS REGULATOR

Marvin H. Grove, Berkeley, Calif., assignor, by mesne assignments, to Marvin H. Grove and Julia E. Grove, both of Berkeley, Calif.

Application April 16, 1932, Serial No. 605,667
Renewed July 5, 1938

15 Claims. (Cl. 50—12)

This invention relates generally to gas regulators such as are employed to control flow of gas or elastic fluids from a relatively high pressure source to a point of demand where a generally lower pressure is required.

It is an object of the invention to devise a gas regulator in which variations in the temperature of the gas will be taken into account, to automatically modify the regulating action. For example in regulating flow of natural or artificial fuel gas, the invention can be employed to deliver gas at substantially constant density at the point of demand.

It is a further object of the invention to devise a gas regulator which will be relatively sensitive in responding to variations in the demand, particularly when the demand suddenly ceases.

A further object of the invention is to provide a regulator of simple construction which can be readily manufactured, and which will be reliable for a variety of services.

Further objects of the invention will appear from the following description in which the preferred embodiments of the invention have been set forth in detail in conjunction with the accompanying drawings. It is to be understood that the appended claims are to be accorded a range of equivalents consistent with the state of the prior art.

Figure 1 is a side elevational view, in cross section, illustrating a device incorporating the present invention.

Fig. 2 is a fragmentary detail, taken along the line 2—2 of Fig. 1.

Fig. 3 is a side elevational view, in cross section, illustrating a modified form of pilot valve means for use with the regulator of Fig. 1.

Fig. 4 is a cross sectional detail taken along the line 4—4 of Fig. 3.

Fig. 5 is a cross sectional detail taken along the line 5—5 of Fig. 3.

Fig. 6 is a diagrammatic view illustrating the manner in which my regulator can be employed in a fuel gas distribution system, including a gas displacement meter.

Referring to Figs. 1 and 2 of the drawings, the apparatus illustrated therein consists of a hollow body 10, provided with inflow and outflow openings 11 and 12. Inflow opening 11 is adapted to be connected to a conduit or pipe 13, leading to a source of gas under pressure, while outflow opening 12 is adapted to be connected to a conduit 14, leading to a point of gas demand. For convenience in manufacture and assembly, body 10 is shown formed of separate lower, intermediate and upper parts numbered 16, 17 and 18 respectively.

Disposed within the valve body 10, in such a manner as to control flow of gas between the inflow and outflow openings, I provide orifice means consisting of a stationary valve seat and a cooperating movable valve member. Thus separating the inflow and outflow openings, there is a wall 19, within which a stationary valve seat ring 21 is mounted. Arranged above the seat ring 21 there is a movable valve member 22, in the form of a disc. Mounted upon the lower face of disc 22, there is a facing 23 made of suitable material, such as a non-metallic composition, which will form a fluid tight seal when in engagement with the upper annular surface of the ring 21.

In order to guide valve member 22 in its movements toward and away from the seat 21, it is shown mounted upon the lower end of a stem 24, and this stem extends through a suitable guide bearing 26. Guide bearing 26 can be formed as an integral portion of the lower body part 16.

Arranged above the valve member 22 and serving as a part of the actuating means for effecting movements of valve member 22, there is a diaphragm 27, made of suitable flexible material such as resilient vulcanized rubber or thin sheet metal. As suitable means for connecting diaphragm 27 to valve member 22, I have shown a pair of spiders 28 engaging opposite sides of the diaphragm, the centers of these spiders, together with the centers of diaphragm 27, being apertured to accommodate a tube 29. Cap 31 threaded to the upper end of tube 29, and a nut 32 likewise threaded upon this tube, serve to clamp spiders 28 upon opposite sides of the diaphragm. The lower end of tube 29 is secured to a rod or pin 33, and the lower end of this pin is secured to the upper end of stem 24.

In order to properly retain the outer peripheral edge portion of diaphragm 27, the intermediate body part 17 is enlarged to form a flange 36. The outer peripheral edge portion of diaphragm 27 is interposed between the upper surface of flange 36, and a corresponding annular surface formed on the upper body part 18. Body parts 17 and 18 can be secured together by suitable means, such as bolts or cap screws. The body is so formed as to provide spaces 38 and 39 upon opposite sides of diaphragm 27, and these spaces form gas chambers as will be presently explained.

Gas chamber 38 is preferably sealed with respect to leakage of gas from the inflow opening 11 about the valve stem 24. Thus for this purpose there is shown a diaphragm 40, made of suitable material such as resilient vulcanized rubber, having its outer peripheral portion clamped between opposed surfaces formed on body parts 16 and 17. The center of diaphragm 39 is apertured to accommodate pin 33, and is secured to pin 33 by suitable means such as nuts 41, in conjunction with sealing washers 42.

Communicating with the upper gas chamber 39 there is a gas passage 43, which is shown connected to a tube or pipe 44. As will be presently explained, it is the venting of passage 43 which controls flexing of diaphragm 27, and the positioning of valve member 22. Both of the gas chambers 38 and 39 have separate points of restricted communication with the inflow side of the device. Thus formed within the body 10 adjacent one side of diaphragm 27, there is a passage 46, which is in communication with the inflow conduit 13 through pipe 47 and the interposed filter 48. Restricted orifices 49 and 51, communicate between gas passage 47 and the chambers 38 and 39.

Gas chambers 38 and 39 also preferably have direct communication through one or more flow restricting orifices, to permit flow of gas between the same. Such communication can be conveniently afforded by providing cap 31 with an orifice 53, communicating between chamber 39 and the interior 54 of tube 29. A plurality of apertures or orifices 56, afford communication between the interior 54 of tube 29 and gas chamber 38.

Valve member 22 and its associated parts, together with its actuating means described above, can be termed primary valve means, and is utilized in conjunction with secondary pilot valve means adapted to control venting of passage 43 and pipe 44. While various pilot valve means can be utilized with good results, the particular means illustrated in Figs. 1 and 2 is desirable in that its controlling action is automatically modified in accordance with temperature changes of the gas being regulated. This pilot valve means as illustrated consists of a body 58, formed for convenience of upper and lower parts 59 and 61. Mounted within the body part 61 there is a stationary valve seat 62 in the form of a ring, with which a movable pilot valve member 63 cooperates. Valve member 63 is suitably guided for movements toward and away from valve seat 62, (as in the modification of Figs. 3 to 5 inclusive to be presently described), and is preferably biased towards seat 62 by means of a compression spring 64. It can be provided with an upper facing 65 of nonmetallic material to facilitate proper sealing engagement with seat 62. A passage 66 formed in body part 61, communicates between pipe 44 and the passage thru seat 62. Gas permitted to flow thru seat 62 is delivered to the outflow conduit 14, through pocket 67, passage 68, and passage 69.

As a part of the actuating means for effecting opening and closing movements of pilot valve 63, I provide a diaphragm 71, which can be made composite as illustrated. Thus in this case the diaphragm consists of two flexible sheets 72 and 73, made of suitable material such as resilient rubber, having their peripheral edge portions clamped between the body parts 59 and 61. The inner portions of sheets 72 and 73 are shown spaced by rigid plate 74, which in turn is connected to the pilot valve member 63 by means of rods 76.

Body 58 is so formed as to provide gas chambers 77 and 78 upon opposite sides of diaphragm 71. Chamber 77 is in communication with the outflow conduit 14, thru tube 79, while chamber 78 is adapted to contain a predetermined quantity of trapped gas. To enable introduction of additional quantities of gas into chamber 78, from the inflow side of the regulator, I provide ducts 81 and 82 to establish communication between chamber 78 and gas passage 66, and which are adapted to be controlled by the needle valves 83 and 84. To enable the venting of gas from chamber 78 to the atmosphere, I provide ducts 86 and 87, communicating between chamber 78 and the atmosphere, and adapted to be controlled by the needle valve 88. When all of the needle valves 83, 84 and 88 are closed, a quantity of gas is trapped in chamber 78, and it is this gas which exerts a downward force upon diaphragm 71, tending to open pilot valve 63.

With the modification of Figs. 1 and 2, diaphragm 71 is so formed that it is capable of transferring heat from the gas in chamber 77, to the trapped gas in chamber 78. In order that surrounding atmospheric conditions should have little effect upon the temperature of gas in chamber 78, body part 59 is provided with a layer 91 of heat insulating material.

Operation of the device described above can best be explained by first assuming that a constant moderate demand is being placed upon the outflow side, that a predetermined amount of gas is trapped in chamber 78, and that the inflow conduit 13 is connected to a source of gas under a pressure generally substantially greater than the pressure required upon the outflow side. Under such conditions the pilot valve member 63 continuously flutters between open and closed positions, at a rate which in certain actual embodiments has approximated 25 to 50 complete cycles per second. Primary valve member 22 takes a mean position some place between full open and closed positions, as determined by the degree of flexing of diaphragm 27. A continual flow of gas from the inflow side occurs through pipe 47, into chambers 38 and 39, through orifices 49 and 51. A continual flow of gas also occurs directly between chambers 38 and 39, through orifices 56 and 53, and a continual venting of gas occurs from chamber 39, thru passage 43, pipe 44, pilot valve seat 62, passages 67, 68 and 69, and thence to the outflow conduit 14. Due to the repeated fluttering movements of pilot valve member 63, pressure conditions in chambers 38 and 39 are continually changing, and therefore a slight amount of movement of diaphragm and main valve member 22 takes place in synchronism but out of phase with the movements of pilot valve member 63. In general however the repeated movements of pilot valve member 63, are in effect largely integrated because of the mass of the main valve member and the parts moving with the same, and the main valve member 22 therefore assumes in general a mean position to properly regulate the flow of gas. Likewise in general under such assumed conditions, the mean static pressure existing in chamber 38 will be somewhat greater than that existing in chamber 39, but the mean static pressures of both these chambers will be substantially less than the static gas pressure upon the inflow side of the device. Pilot valve member 63 continually flutters, for the reason that it is in a state of labile equilibrium with respect to resilient forces acting upon the same. These forces include the fluid forces acting downwardly upon diaphragm 71 by virtue of the gas trapped in chamber 78, fluid forces acting upwardly upon diaphragm 71 by virtue of gas in chamber 77, the bias of spring 64 in the event this spring is employed, and fluid forces acting directly upon pilot valve member 63 by virtue of gas pressure in passage 66. The lower open end of tube 79 is likewise in fairly close proximity to the outflow side of the primary valve seat 21, so that gas pressure waves, superposed upon the continuous flow of gas, created by virtue of the fluttering of main valve member 22, can react upwardly through tube 79, and upon the lower side of diaphragm 71.

If the operating conditions assumed above are changed, as for example by decreasing the demand of gas from conduit 14, the effect is to cause pilot valve member 63 to automatically effectively reduce the mean rate of venting of gas through passage 43. Reducing the mean rate of venting of gas through passage 43, causes a relatively higher pressure to be built up in chamber 39, so that diaphragm 27 is flexed downwardly to cause the main valve member 22 to assume a new position in which it offers a greater restriction to the flow of gas through the main valve seat 21. Likewise if the demand upon the outflow conduit 14 is increased, the reaction upon pilot valve member 63 causes the main valve member 22 to assume a new mean position in which it offers less restriction to the flow of gas through primary seat 21.

In the event of a sudden shutdown, that is a sudden cessation of demand, pressure in outflow conduit 14 tends to increase and a corresponding increase of gas pressure in chamber 77 immediately causes diaphragm 74 to flex upwardly, to maintain pilot valve member 63 in closed position. Interruption of the venting of passage 43 likewise immediately causes pressure to build up in chamber 39, to effect movement of primary valve member 22 to closed position. It should be noted that to effect complete closing of the main valve member 22, the gas pressure in chamber 39 need not build up to a value substantially equal to that of the inflow pressure to the regulator. This is for the reason that to flex diaphragm 27 downwardly, pressure in chamber 39 need only balance the pressure in chamber 38, and the pressure in chamber 38 at the instant a shutdown is effected is substantially less than the inflow pressure to the regulator, due to the continual flow through orifices 53 and 56. It is for this reason that my device is not sluggish in responding to a cessation of demand, but responds immediately to quickly close the main valve member, and thus prevent the building up of too high a pressure in the outflow conduit. I likewise largely attribute the sensitivity of my device to changes in the demand, and to changes in the differential pressure between the inflow and outflow sides, to the fact that chambers 38 and 39 both have restricted communication with the inflow side of the device and are in direct restricted communication.

During periods when there is no gas demand upon outflow conduit 14, the pressures in chambers 38 and 39 assume a value substantially equal to the inflow pressure to the device. If a demand is now placed upon outflow conduit 14, pilot valve member 63 immediately vents passage 43, thus causing a lowering of gas pressure in chamber 39 and a flexing of diaphragm 27 upwardly to open valve member 22.

If it is desired to adjust the pressure level in the outflow side, this is accomplished by varying the amount of trapped gas in chamber 78.

In the above discussion of the mode of operation, reference has been made only to the general flow regulating characteristics of the device. If the temperature of trapped gas in chamber 78 remains substantially constant, then the regulation will be such that the pressure of the gas upon the outflow side of the device will be maintained substantially constant, independently of variations in the demand, and independently of variations in the differential pressure between the inflow and outflow openings. Obviously this will not hold true for abnormal conditions, as for example where the demand upon the outflow side is at a maximum, and the source of gas under pressure is inadequate to maintain an inflow gas pressure somewhat greater than the pressure desired upon the outflow side. Under such abnormal conditions both the pilot valve member 63, and the main valve member 22, remain in full open position. In certain types of service, particularly where the device is utilized for regulating flow of natural or artificial fuel gas to a point of consumption, the temperature of the gas may vary between wide limits. If a constant pressure regulator is utilized under such conditions, the density of the fuel gas upon the outflow side must necessarily vary in accordance with temperature changes. With my device action of the pilot valve means is automatically modified, in accordance with such temperature changes, to deliver gas upon the outflow side at a substantially constant density, rather than at a constant pressure. This is by virtue of the fact that diaphragm 71 will effect an exchange of heat between the gases in chambers 77 and 78, so that the temperature of the trapped gas in chamber 78 will always approximate the temperature of the gas in chamber 77. The temperature of the gas in chamber 77 is likewise substantially the same as the temperature of the gas in the outflow conduit 14. Thus if the temperature of the outflow gas increases by a certain amount, an exchange of heat occurs thru diaphragm 71, to correspondingly increase the temperature of the trapped gas in chamber 77. Thus the trapped gas will tend to exert a greater fluid pressure downwardly upon diaphragm 71, to modify actuation of pilot valve 63 accordingly. The net result is to cause a somewhat higher pressure to be maintained in outflow conduit 14, to maintain the density of the fuel gas in this conduit substantially constant. Likewise a lowering of the temperature of the gas in chamber 78 responsive to a lowering of the temperature of the outflow gas, causes a lesser pressure to be maintained in outflow conduit 14 to maintain the density of the gas constant. Insulating jacket 91 tends to isolate chamber 78 from the surrounding atmosphere, so that the temperature of the trapped gas may fairly closely approximate the temperature of the outflow gas.

The utility of a device which will regulate flow of gas to secure substantially constant density of gas upon the outflow side, can be demonstrated more clearly by reference to Fig. 6. In this case the device of Fig. 1 has been represented diagrammatically at 93, and the inflow and outflow connections to the same are indicated by lines 94 and 96. The outflow gas from line 96 is shown passed through a volumetric displacement metering device 97, the outflow side of which is connected to a point of demand 98 by line 99. The point of demand 98 can be representative of a fuel gas burner. For a given flow orifice at the point of demand 98, fuel gas of a constant density, and therefore constant B. t. u. value, will be supplied. Likewise the readings of the displacement meter 97, will be correct irrespective of temperature variations in the fuel gas. In prior fuel gas distribution systems, utilizing constant pressure regulating devices and ordinary displacement meters, it has been necessary to correct the reading of the meter in accordance with temperature changes in the fuel gas, in order to make an accurate determination of the amount of gas actually delivered to the point of demand.

In Figs. 3 to 5 inclusive, there is shown a modification of the pilot valve means incorporated in the device of Fig. 1. In this instance, in place of relying on heat transfer through diaphragm 71, the walls of the trapped gas chamber are blanketed with outflow gas. Thus in this case the body 101, is likewise for convenience formed of upper and lower separable parts 102 and 103. Mounted within body part 103, there is a pilot valve seat 104, adapted to cooperate with a movable valve member 106. This valve member is shown biased toward closed position by means of compression spring 107. Passageway 108 leads to the inflow of pilot valve seat 104, and serves to communicate with pipe 44. A composite diaphragm 109 is arranged above pilot valve member 106, and has its peripheral edge portions clamped between the body parts 102 and 103. A perforated plate 110 is mounted above the diaphragm to prevent undue upward flexing. Upon opposite sides of diaphragm 109, gas chambers 111 and 112 are formed. The walls defining chamber 112 are made of relatively good heat conducting material, such as metal, and are enclosed by an outer casing or dome 113, in such a manner as to form an enveloping or jacketing space 114.

Gas from the outflow side of pilot valve seat 104 is received within a pocket 116, and is caused to flow from this pocket into the jacketing space 114, by way of passage 117. After flowing through space 114, the gas is delivered to the outflow conduit 14, thru a passage 118, and the tube or pipe connection 119. Chamber 111 is likewise in communication with passage 118, (and therefore in communication with outflow conduit 14) thru the port or passage 121.

Needle valves 122 and 123 serve to permit introduction of additional gas into chamber 112, by way of ducts 124 and 126. Needle valve 127 serves to control venting of gas from chamber 112 to the atmosphere, thru ducts 128 and 129.

The connection between diaphragm 109 and pilot valve member 106, has been represented in Fig. 4 as comprising spaced parallel rods 131, having their upper ends connected to diaphragm 109, and having their lower ends secured to pilot valve member 106. These valves are slidably received in guide journals 132, which can be formed within the lower body part 103.

When the pilot valve means of Figs. 3 to 5 inclusive is incorporated in place of the pilot valve means of Fig. 1, operation of the device is substantially the same as that previously described. However exchange of heat between the outflow gas and the trapped gas in chamber 112, in this instance occurs chiefly by virtue of heat transfer thru the heat conducting walls of chamber 112.

In addition to the characteristics of my invention which have previously been described, it will be noted that the invention makes possible the use of a simple poppet type main valve, with a single guide bearing for the valve stem. In gas regulators of the prior art complicated forms of balanced main valves have been utilized, but the degree of automatic regulation has not been effective as in my device, due to other inherent features making for poor regulation.

My invention has been illustrated in the drawings in a manner to facilitate explanation of the elements and operation involved, rather than to serve as a design for actual commercial manufacture. In adapting the invention for actual commercial manufacture, it may be mentioned that good results have been secured by making the flow restricting orifice 51 substantially larger than the lower orifice 49, and by making orifices 53 and 56 equivalent to an orifice substantially greater in diameter than either of the orifices 49 and 51. For example in one practical embodiment, diaphragm 27 was about 18 inches in diameter, the volume of chamber 38 about 250 cubic inches and the volume of chamber 39 about 200 cubic inches, orifice 49 was about $\frac{1}{16}$ inch in diameter, orifice 51 about $\frac{1}{8}$ inch in diameter, and orifices 53 and 56 of such diameter as to be equivalent to a single orifice of about $\frac{1}{4}$ inch in diameter.

It is apparent that my invention may be modified in many respects within the scope of the appended claims. For example the device will function as a regulator, with various forms of pilot valve means substituted in place of the means described herein which takes the temperature of the gas into account. However I deem it desirable to utilize pilot valve means in which the pilot valve member will flutter at a relatively rapid rate. In addition to many conceivable modifications for the primary valve means, it may be pointed out that the flow restricting orifice between chambers 38 and 39, may be an aperture formed directly through diaphragm 27, rather than by the use of orifices 53 and 56 as illustrated.

I claim:

1. In a gas flow regulating device, a hollow body having an inflow opening adapted to be connected to a source of gas under pressure and having an outflow opening adapted to be connected to a point of gas demand, orifice means adapted to control flow of gas through said body, said orifice means including a stationary seat and a cooperating movable valve member, and actuating means associated with said valve member, said actuating means including a movable member separating a pair of opposed gas chambers, there being a gas passage communicating with one of said chambers and adapted to be vented to effect opening of the valve member, separate points of continuous communication between both of said chambers and the inflow side of the regulator, and an equalizing flow orifice communicating between said chambers.

2. In a gas flow regulating device, a hollow body having an inflow opening adapted to be connected to a source of gas under pressure and having an outflow opening adapted to be connected to a point of gas demand, orifice means for controlling flow of gas through said body, said orifice means including a stationary seat and a movable cooperating valve member, and actuating means associated with said valve member, said actuating means including a diaphragm connected to the valve member, means forming gas chambers upon opposite sides of the diaphragm, there being a gas passage communicating with one of said chambers adapted to be vented to effect opening of the valve member, separate points of continuous communication between both of said chambers and the inflow side of the regulator, and an equalizing flow orifice communicating between said chambers.

3. In a gas flow regulating device, a hollow body having an inflow opening adapted to be connected to a source of gas under pressure and having an outflow opening adapted to be connected to a point of gas demand, orifice means associated with said body and adapted to control flow of gas to the same, said orifice means including a stationary seat and a cooperating movable valve member, and actuating means associated with said valve means, said actuating means including a flexible diaphragm connected to said valve member, and means forming gas chambers upon opposite sides of the diaphragm, there being a passage communicating with one of said chambers adapted to be vented, separate points of continuous restricted communication between both of said chambers and the inflow side of the regulator, and an equalizing flow orifice communicating between said chambers.

4. In a gas flow regulating device, a hollow body having an inflow opening adapted to be connected to a source of gas under pressure and having an outflow opening adapted to be connected to a point of gas demand, orifice means associated with said body and adapted to control flow of gas through the same, said orifice means including a stationary seat and a cooperating movable valve member, actuating means associated with said valve member, said actuating means including a flexible diaphragm connected to said valve member, means forming a pair of opposed gas chambers separated by said flexible diaphragm, there being a gas passage communicating with one of said chambers adapted to be vented, means for establishing uninterrupted restricted communication between both of said chambers and the inflow side of the regulator for all operating positions of the valve member, and an equalizing flow orifice communicating between said chambers, and pilot valve means adapted to control venting of said passage.

5. In combination, a control unit comprising a casing, a diaphragm dividing the unit into two compartments, means for trapping gas under a predetermined pressure in one compartment, the pressure of the trapped gas in said one compartment serving as the sole means for urging said diaphragm in one direction, a conduit for conveying gas under pressure into the other compartment, a valve for closing the conduit and being operatively connected to the diaphragm, said diaphragm opening the valve when the gas pressure in the first compartment is higher than in the second, said second compartment enveloping the first compartment, whereby the temperature of the fluid in the first compartment will be substantially the same as the temperature of the fluid in the second compartment.

6. In combination, a high pressure gas line, a low pressure gas line, a valve for controlling the flow of gas from the high pressure line into the low pressure line, a high pressure by-pass pipe communicating with the high pressure line, a diaphragm-controlled pilot valve for the by-pass pipe, a compartment for trapping a gas at a low pressure, a diaphragm acted upon by the trapped gas and being connected to the pilot valve for opening it, gas-conveying means receiving the gas passing from the pilot valve and leading it around the compartment and then to the low pressure line, whereby the temperature of the gas flowing around the compartment causes the trapped gas to raise or lower to an equal temperature, and means actuated by the gas flowing in the by-pass for operating the first valve.

7. In combination, a compartment for trapping a gas under low pressure, a diaphragm having the pressure of the trapped gas active on one side, said trapped gas serving as the sole means for urging the diaphragm in one direction, a high pressure gas line, a valve for the line and being connected to the diaphragm so as to be opened by the pressure of the trapped gas, a low pressure line receiving the gas from the valve, a compartment disposed on the other side of the diaphragm, communications between the low pressure line and the second compartment for causing the pressure in the low pressure line to become active on the other side of the diaphragm, said communications conveying the gas issuing from the valve, around the first compartment for causing the temperature of the trapped gas to equal that in the low pressure line.

8. In combination, a valve housing, having a valve seat, a valve stem carrying a valve for closing upon the seat, said housing having an inlet for allowing gas under pressure to bear against said valve, said housing having a chamber, a diaphragm dividing the chamber into two compartments, said diaphragm operating the valve stem, means for delivering gas under pressure to both compartments, a control valve for regulating the escape of gas from one of the compartments, and a by-pass with a restricted orifice placing the compartments in communication with each other.

9. In combination, a control valve, a gas pressure actuated diaphragm for operating the valve, a by-pass for allowing the fluid from either side of the diaphragm to flow to the other side, a second diaphragm for closing the valve, means for delivering fluid under pressure against the second diaphragm and on opposite sides of the first diaphragm, a control valve for controlling the escape of gas from one side of the second diaphragm, the second diaphragm serving to actuate the control valve, a constant gas pressure active on one side of the second diaphragm, the gas escaping from the control valve being active on the other side of the second diaphragm.

10. In a gas flow regulating device adapted to have its inflow side connected to a source of gas under pressure and its outflow side connected to a point of gas demand, automatic means for regulating the rate of flow in accordance with changes in the demand, and to supply gas to the outflow side at a substantially constant density, said means including means substantially independent of varying atmospheric temperatures for modifying the regulating action in accordance with changes in the temperature of the gas.

11. In a gas flow regulator, a hollow body having an inflow opening adapted to be connected to a source of gas under pressure, and having an outflow opening adapted to be connected to a point of gas demand, a movable valve member within the body for controlling flow of gas through the same, a flexible diaphragm operatively connected to the valve member, said body being formed to provide a sealed chamber containing trapped gas under pressure on one side of the diaphragm, said body being also formed to provide a chamber on the other side of the diaphragm which is in communication with outflow side of the regulator, said trapped gas being in heat transferring relationship with the gas being regulated and serving as the sole means for urging the diaphragm in one direction, whereby the ratio between the force exerted on said one side of the diaphragm, and variations in the pressure of the trapped gas due to variations in temperature, will remain constant, and means serving to isolate said trapped gas with respect to temperature changes of external atmosphere.

12. In a gas flow regulating device, a body having an inflow passage for connection with a source of gas, the source of gas being subject to temperature variations and being under pressure, and also having an outflow passage for connection with a point of gas demand, a valve member movably mounted within the body and serving to control flow of gas through the same, a flexible heat conducting diaphragm operably connected to the valve member for moving the same, a sealed gas chamber formed on one side of the diaphragm, said chamber being formed of heat conducting wall portions of the body, trapped gas under pressure within said chamber and serving as substantially the sole means for biasing the diaphragm in one direction to open the valve member, a gas chamber on the other side of the diaphragm having communication with the outflow side of the body, and heat insulation covering said heat conducting wall portions, thereby causing the temperature of gas in said sealed chamber to assume substantially the same temperature as the temperature of the gas in the second chamber.

13. In a gas flow regulating device, a body having an inflow passage for connection with a source of gas, said source of gas being subject to temperature variations and being under pressure, said body also having an outflow passage for connection with a point of gas demand, a valve member movably mounted within the body and serving to control flow of gas through the same, a flexible diaphragm operably connected to the valve member for moving the same, a sealed gas chamber formed on one side of the diaphragm, said chamber being formed by rigid heat conducting wall portions of the body, trapped gas under pressure within said chamber and serving as substantially the sole means for biasing the diaphragm in a direction to open the valve member, a gas chamber on the other side of the diaphragm and in communication with the outflow side of the body, and means for jacketing a substantial area of said wall portions with a stream of gas flowing through the body to the outflow side of the same.

14. In a fluid pressure regulator, a body having passages for inflow and outflow of fluid, a valve member within the body and having a travel of movement in opposite directions between open and closed positions to control flow of fluid through the same, a flexible diaphragm connected to the valve member for conjoint movement with the same, a rigid wall extending substantially over one side of the diaphragm to form a confined fluid space between the wall and the diaphragm, an orifice of relatively small diameter serving to vent said space and serving to materially impede fluid flow from said space, and means forming a fluid space upon the other side of the diaphragm, said latter fluid space being relatively large compared to the first named fluid space and being vented to the outflow side of the regulator.

15. In a fluid pressure regulator, a body having passages for inflow and outflow of fluid, a valve member within the body and having a substantial travel of movement in opposite directions between open and closed positions to control flow of fluid through the same, a flexible diaphragm connected to the valve member for conjoint movement with the same, a rigid wall extending substantially entirely over one side of the diaphragm and parallel thereto to form a confined fluid space, said space being increased as the diaphragm flexes to move the valve member toward open position, an orifice of relatively small diameter serving to vent said space and serving to materially impede fluid flow from said space as the diaphragm flexes to move the valve toward closed position, and means forming a fluid space upon the other side of the diaphragm, said latter fluid space leaving the other side of the diaphragm unconfined for the positions of the diaphragm corresponding to either closed or full open position of the valve member, said last named space being vented to the outflow side of the regulator.

MARVIN H. GROVE.